Oct. 18, 1960     L. GOULET     2,956,716
TIRE STAND FOR MOTOR TRUCKS
Filed April 10, 1959
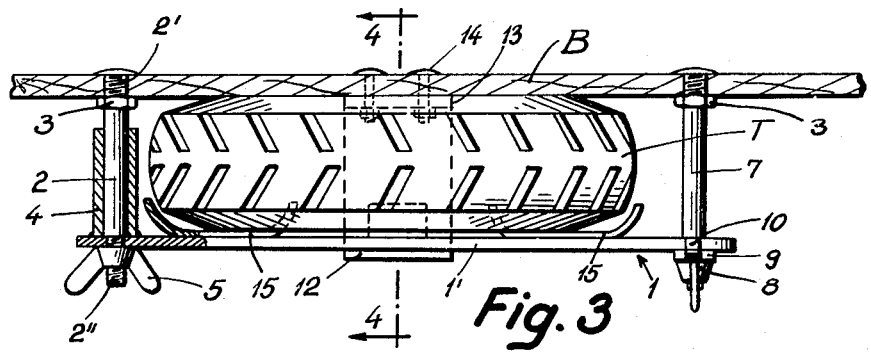
Fig. 3
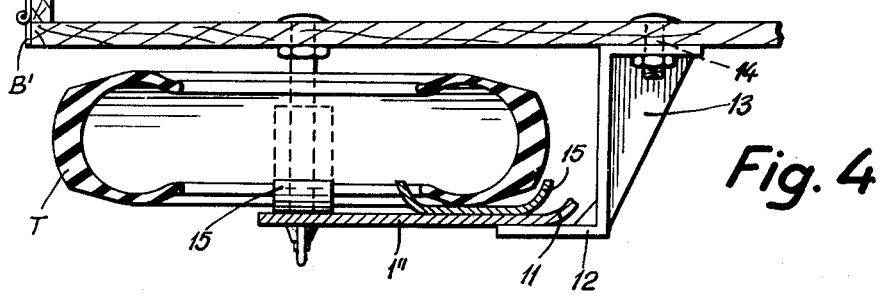
Fig. 4
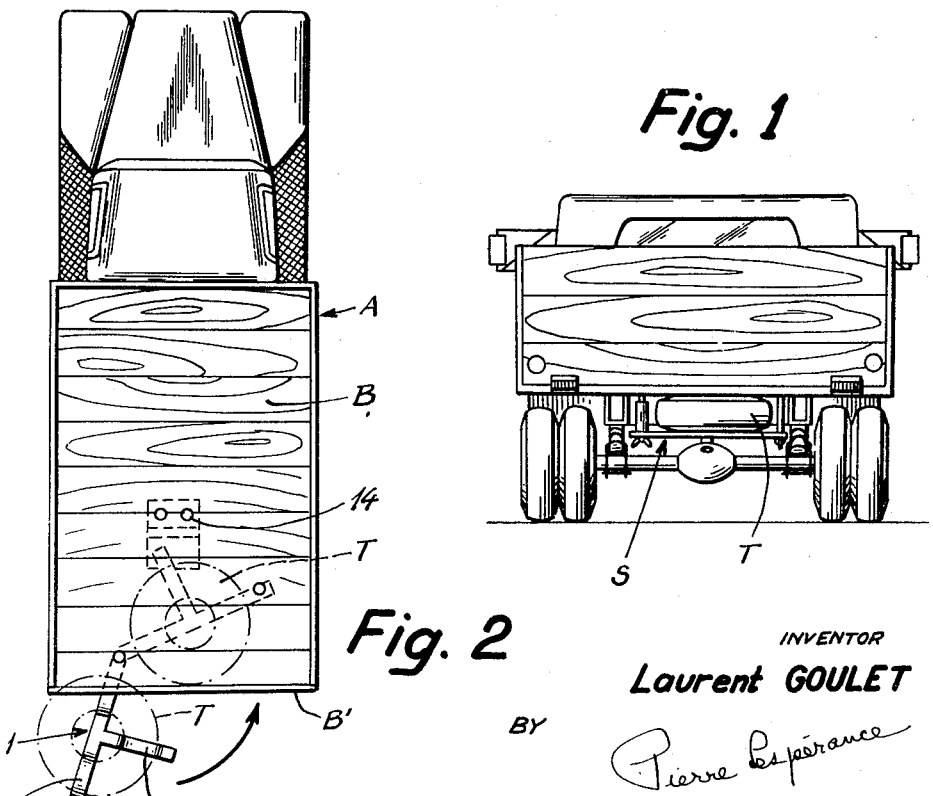
Fig. 2
Fig. 1
INVENTOR
Laurent GOULET
BY
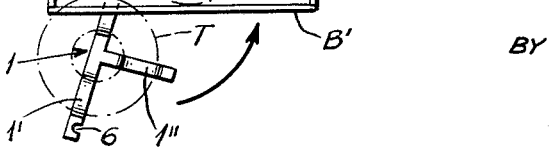
PATENT AGENT

# United States Patent Office 2,956,716
Patented Oct. 18, 1960

2,956,716
TIRE STAND FOR MOTOR TRUCKS
Laurent Goulet, Box 73, St-Prosper, Quebec, Canada
Filed Apr. 10, 1959, Ser. No. 805,478
3 Claims. (Cl. 224—42.21)

The present invention relates to motor vehicles and more particularly to a tire stand for the spare tire of motor trucks.

It is known that the spare tire of motor trucks is often carried underneath the truck platform at the back of the vehicle. The conventional tire stands are difficult to manipulate being in a rather inaccessible place and the tire removal is a time expensive operation.

The main object of the present invention is the provision of a tire stand of improved construction which considerably facilitates the removal of the spare tire from the stand and replacing back of the same in clamped position.

Yet another important object of the present invention is the provision of a stand of the character described which is inexpensive to build and which is characterised by the fact that the truck platform itself serves as one side of the stand for maintaining the tire in proper position.

The foregoing and other important objects of the present invention will become more apparent during the following disclosure and by referring to the drawings in which:

Figure 1 is a back elevation of a motor truck with the tire stand of the present invention;

Figure 2 is a top plan view of the truck showing how the tire stand is manipulated between tire releasing and tire clamping positions;

Figure 3 is an elevation partly in section of the tire stand; and

Figure 4 is a cross-section along line 4—4 of Figure 3.

Referring now more particularly to the drawings in which like reference characters indicate like elements throughout, the spare tire T, which may comprise an entire spare wheel, is supported at the back of the motor truck A underneath the platform B of said truck by means of the tire stand generally indicated at S. The stand S comprises a T-shaped bar 1 which consists of a main leg 1' and a side leg 1". The T-shaped bar 1 is disposed in a horizontal plane and is arranged for pivotal movement in said plane about a bolt 2 which extends downwardly from platform P and is rigidly secured thereto having its upper threaded head part 2' passing through platform B and being secured by means of nut 3.

A sleeve 4 is welded or otherwise secured to one end of the main leg 1' of T-bar 1 and fits over the bolt 2 for pivotal as well as sliding movement on said bolt. The lower end of bolt 2 has threads 2" for receiving a wing nut 5. Rotation of wing nut 5 will adjust the level of the T-bar 1 on bolt 2, and secures one end of the T-bar to said bolt.

The other end of the main leg 1' is provided with a laterally opening notch 6 adapted to engage the lower end of a second bolt 7 extending downwardly from platform B and rigidly secured thereto. Bolt 7 is similar to bolt 2 and its lower end has threads for receiving a wing nut 8 and a washer 9 having an upstanding lip 10 adapted to engage the outer edge of the T-bar 1 for preventing disengagement of said T-bar.

The side leg 1" of the T-bar 1 has an upwardly curved outer end 11 adapted to slide over the horizontal flange 12 of a bracket 13 which is secured underneath the platform B of the truck as by means of bolts 14. The T-bar 1 is provided with trough-shaped tire retaining plates 15 which are secured to side leg 1" and to the two end portions of the main leg 1'. Each retaining element 15 consists of an elongated plate having upwardly curved ends and is adapted to partially embrace the tire T at three spaced points so as to prevent displacement of said tire relative to the T-bar 1.

Pivot bolt 2 is nearer the rear edge B' of platform B than support bolt 7 such that when the T-bar 1 is pivoted from its opened position shown in full line in Figure 2 into its closed position shown in dotted line, the main leg 1' will extend at an angle to the rear edge B' of the motor truck such that the peripheral edge of the tire will be entirely underneath the platform B and yet when the T-bar is in opened position, a maximum amount of the tire will project beyond said platform for ease in removing the tire from the T-bar 1. Bracket 13 is disposed underneath the platform forwardly of bolts 2 and 7 and at substantially equal distances from said bolts so as to support side leg 1" when T-bar is in closed position with the tire thereon but with said tire still in lowered position as shown in Figure 4, that is with the wing nuts 5 and 8 partially unscrewed.

Once the support and the tire are in this position, the wing nuts 5 and 8 are screwed to thereby elevate T-bar 1 and the tire until the latter is squeezed between the T-bar and the lower surface of platform B as clearly shown in Figure 3 thereby effectively clamping the tire against displacement during running of the truck.

From the foregoing it will be apparent that due to the fact that the two bolts 2 and 7 lie on line inclined at more than ninety degrees with respect to the long axis of the truck such that the T-bar 1 will move through more than ninety degrees from open to closed position, the tire can be moved from underneath the platform a maximum amount for ease of taking the same off T-bar 1 while still allowing the tire to be stored fully underneath the platform.

It will be seen also that platform B serves in the clamping of the tire against movement.

While a preferred embodiment of the present invention has been illustrated and described, it is understood that various modifications may be resorted to without departing from the spirit and scope of the appended claims.

What I claim is:

1. A spare tire stand for motor trucks having a back platform, comprising a pair of bolts rigidly secured to said platform, downwardly extending therefrom, spaced from each other a distance slightly greater than the diameter of a spare tire and disposed along a line making an angle with the free edge of the platform, one bolt being nearer said free edge than the other, a T-shaped bar having a main leg and a side leg, a sleeve at one end of said main leg fitted on the bolt nearer to said free edge for sliding as well as pivotal movement on said last named bolt, a notch at the other end of said main leg of said T-shaped bar adapted to engage the other one of said bolts, trough-shaped tire retaining plates secured to said side leg and to said main leg on both sides of said side leg for receiving and partially embracing a tire at three spaced points thereof, said T-shaped bar and tire being pivotable about said first named bolt between a position in which said tire is practically fully exposed outwardly of said platform and a position in which said T-bar and tire are completely stored underneath said platform with said notch engaging said second bolt, and nut means threadedly engaging said bolts for moving said T-bar upwardly along said bolts and for clamping said tire by squeezing said tire between said T-bar and the lower surface of said platform.

2. A spare tire stand as claimed in claim 1, further including a bracket secured to and disposed underneath said platform forwardly of said bolts and adapted to receive the free end of said side leg.

3. A tire stand as claimed in claim 2, further including latching means for preventing disengagement of said notched end of said main leg from said second bolt.

References Cited in the file of this patent

UNITED STATES PATENTS

| | | |
|---|---|---|
| 2,325,848 | Gildea et al. | Aug. 3, 1943 |
| 2,574,465 | Clark | Nov. 13, 1951 |
| 2,777,591 | Manzatuik | Jan. 15, 1957 |